Aug. 12, 1952     E. N. McGREW     2,606,391
INSECT TRAP
Filed March 30, 1949
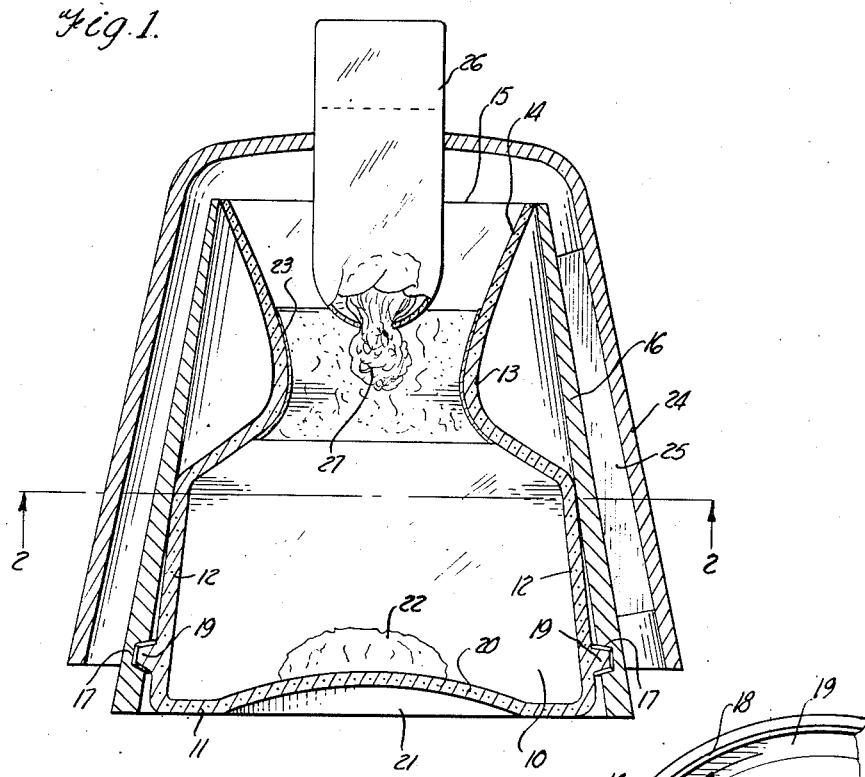
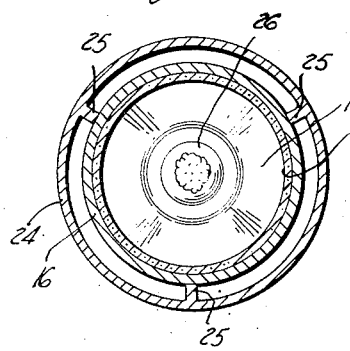
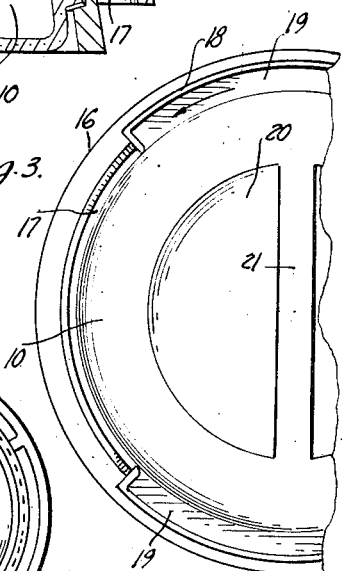
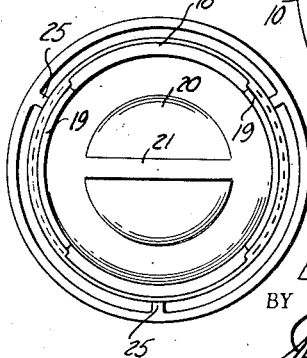
INVENTOR.
EDWARD N. McGREW
BY
HIS ATTY.

Patented Aug. 12, 1952

2,606,391

UNITED STATES PATENT OFFICE 2,606,391

INSECT TRAP

Edward N. McGrew, Fort Smith, Ark.

Application March 30, 1949, Serial No. 84,349

1 Claim. (Cl. 43—121)

This invention relates to an insect trap, and more particularly to a roach trap, and has for one of its objects the production of a simple and efficient roach trap which is free from the use and hazards of poison.

A further object of this invention is the production of a simple and efficient trap which will retain captured roaches alive for a considerable period of time, so that the roaches may be used for fish-bait, when so desired.

Other objects and advantages of the present invention will appear throughout the following specification and claim.

In the drawing:

Figure 1 is a vertical sectional view of the trap;

Figure 2 is a horizontal sectional view of the trap;

Figure 3 is a fragmentary bottom plan view of the inner container and inner cone, showing the locking flanges of the container disengaged from the flange receiving slots formed upon the inner face of the inner cone;

Figure 4 is a bottom plan view on a reduced scale, showing the assembled inner container, inner cone, and outer casing of the insect or roach trap.

By referring to the drawing, it will be seen that 10 designates an inner container which may be formed of glass, transparent plastic or any other suitable material. The container 10 comprises a base 11 having inclined and converging side walls 12 terminating in a restricted open neck 13 having an upwardly extending laterally flared upper end 14. The flared upper end 14 provides an enlarged entrance opening 15 for the container 10 at the upper end of the container.

An inner tapering cone 16 is fitted over the inner container 10, as shown in Figure 1, both the upper and lower ends of the cone 16 being open. The upper end of the cone 16 surrounds the entrance opening 15, is flush therewith, and fits snugly therearound. The inner cone 16 is provided with diametrically oppositely arranged segmental slots or channels 17 formed in the inner face of the cone 16 near the lower edge thereof and extending about one-fourth of the circumference of the cone 16 in a horizontal plane. The inner face of the cone 16 is provided with notched or cut-away portions as at 18, intermediate the ends of the respective slots or channels 17 to receive the diametrically opposed laterally extending segmental lugs 19 which are carried by the container 10 near the base thereof. The lugs 19 are in the same horizontal plane as the slots or channels 17 when the container 10 is fitted within the inner cone 16 and the lugs 19 are in registration with the notched portions 18. The container 10 may be rotated one-quarter of a turn to fit the segmental lugs 19 into the slots 17 of the cone 16 thereby locking the container 10 and cone 16 in a properly assembled relation. By reversing the rotation of the container, the container 10 and cone 16 may be separated easily, as will be obvious by considering the drawing. The bottom of the container is preferably provided with an inwardly arched socket 20 and a transverse rib 21 spans the socket 20 to provide a finger-grip to facilitate the turning or rotation of the container 10. A suitable bait 22 is placed upon the bottom of the container 10 as shown in Figure 1. As is shown in Figure 1, the inner container 10 abuts the inner face of the cone 16 at the junction of the converging walls 12 and the restricted neck 13 at a point inwardly of the entrance of opening 15 to facilitate the centering of the flared upper end of the container 10 within the upper end of the cone 16 without danger of breakage.

A band of suitable non-drying liquid 23 is placed upon the inner face of the restricted open neck 13 and this band 23 follows the contour of the neck. The band 23 extends under the restricted neck for a short distance and upwardly of the flared portion of the neck, in the manner shown in Figure 1. Various liquids, colloids, emulsions (liquids of high relative viscosity) may be used. It is obvious that emulsion colloid or emulsoids may be used as well as gels or jellies, within the scope of the present invention.

An inverted cup-like cover or outer cone 24 is fitted over the upper end of the inner cone 16, and container 10, and the outer cone 24 is held in spaced relation upon the sides of the cone 16 and above the cone 16 and the entrance opening 15 of the container 10, by means of the interposed ribs 25. A glass or plastic vial 26 is suspended in the upper end of the outer cone or cover 24 and extends down into the flared portion of the neck 13 and through the entrance opening 15 of the container 10. The vial 26 preferably contains a suitable quantity of water or other liquid to properly moisten the cotton plug 27 which is fitted in and is suspended from the opening at the lower end of the vial 26. Any suitable type of moisture-dispensing plug may be used which will retain the liquid in the vial and at the same time retain the moisture itself as long as moisture is contained in the vial 26.

By noting Figure 1, it will be seen that the restricted neck 13 of the container 10 is provided with an under and laterally curved annular shoulder at the bottom of the neck and outwardly and upwardly inclined walls leading toward the entrance opening 15 of the neck 13.

It should be noted that the shape of the neck 13 of the container 10 provides a suitable declining surface upon which non-drying liquids, colloids and gels, all of said liquids having high relative viscosity up to the gels. The gels do not have true viscosity until the temperature has been so raised as to change them to the liquid phase. All liquids of high viscosity are not non-drying, but this invention deals with the non-drying liquids of high viscosity and gels, and provides an increasing declining surface for their proper use. Hydrophilic refers to the liquids and gels that have an attraction for water, or take up water from air. This makes them attractive to roaches and some of the other crawling insects, and at the same time the moisture reduces traction so that the insects cannot overcome gravity.

The vial 26 and saturated or moistened plug 27 provide a humidifier which increases or maintains a near water saturated air within the trap, and supplies water or moisture for the hydrophilic dressing which is applied to the declining surface of the container, and further permits the expulsion of moisture in the form of humid air together with the more volatile portions of the solution placed in the humidifier. This condition within the trap serves to induce roaches and other insects to enter the trap, and the insects will stay alive for many weeks so that they may be used as fish-bait. The added dry bait does not mold for a much longer time than when water has been applied directly thereto.

The outer surface of the inner cone 16 is preferably faced or molded completely of some form of wood pulp, such as paper, cardboard, papier-mâché, or some similar product, since this type of footing offers little or no resistance to roaches and most other insects. Cotton fabric may serve in some instances to obtain desired results. Cellulose fibers in a near natural state have been found to be satisfactory.

As shown, the vial 26 preferably extends through an aperture in the top of the outer casing or cone 24, and this casing or cone 24 may be formed of any suitable material.

The non-drying liquid 23 or oily bait dressing may be of the type disclosed in my co-pending application, filed April 18, 1944, Serial Number 531,464, now abandoned, and relating to Roach Traps, if desired.

It should be noted that the ribs 25 which are inclined inwardly and are parallel with the converging side walls of the cone 24, support the outer inverted cup-like cover or cone 24 in spaced relation to the inner cone 16. The bottom edge of the cover or cone 24 is supported above the bottom edge of the cone 16, as shown in Figure 1, to provide an entrance for the insects under the bottom edge of the cover or cone 24. The insects will pass under the bottom edge of the cover or cone 24 and crawl up the inclined sides of the cone 16 and down into the container 10. The shape of the container and the humidified air therein will tend to prevent the insects from climbing upwardly upon the inner face of the container, and the band 23 will act as a barrier through which the insects cannot crawl outwardly of the container, while at the same time permitting the insects to readily crawl downwardly into the container 10.

Having described the invention, what I claim as new is:

An insect trap comprising an inner bait container having a base adapted to rest upon a support, said inner container having a converging side wall terminating in a restricted neck, the neck terminating in an upwardly and laterally inclined wall defining a flared upper end, said upper end having an entrance opening at the upper extremity thereof, a cone member fitting over said inner container and adapted to rest upon the support in a position surrounding the base of said inner container, said cone member having an open upper end surrounding the entrance opening of the inner container and fitting snugly in flush contacting relation around the upper end of the inner container, said container abutting the inner face of said cone member at the junction of said converging side wall and said restricted neck at a point inwardly of said open upper end of said cone member to facilitate the centering of the flared upper end of the inner container within the upper end of the cone member and to avoid breakage in assembly, an inverted cup-like cover fitting over the upper ends of the inner container and cone member in spaced relation thereto, means interposed between the cone member and cover for supporting the cover in suspended surrounding spaced relation to the cone member and defining insect entrance runways between the inner container and cone member leading from the bottom of the trap to the upper end of the inner container and cone member, and the bottom of the cover terminating above the bottom of the cone member to provide an insect entrance below the cover.

EDWARD N. McGREW.

REFERENCES CITED

The following references are of record in the file of this patent:

UNITED STATES PATENTS

| Number | Name | Date |
|---|---|---|
| 1,047,282 | Penn | Dec. 17, 1912 |
| 1,569,170 | Braun | Jan. 12, 1926 |
| 2,219,959 | Laidley | Oct. 29, 1940 |
| 2,372,747 | Sullivan | Apr. 3, 1945 |
| 2,435,317 | McGrew | Feb. 3, 1948 |

FOREIGN PATENTS

| Number | Country | Date |
|---|---|---|
| 2,021 | Great Britain | 1893 |
| 13,531 | Great Britain | 1894 |